United States Patent
Grund

(10) Patent No.: US 9,279,718 B2
(45) Date of Patent: Mar. 8, 2016

(54) METHODS, SYSTEMS, AND DEVICES FOR MULTIBEAM COHERENT DETECTION AND SPECKLE MITIGATION

(71) Applicant: LightWorks II, LLC, Longmont, CO (US)

(72) Inventor: Christian J. Grund, Boulder, CO (US)

(73) Assignee: Light Works II, LLC, Longmont, CO (US)

(*) Notice: Subject to any disclaimer, the term of this patent is extended or adjusted under 35 U.S.C. 154(b) by 212 days.

(21) Appl. No.: 13/767,288

(22) Filed: Feb. 14, 2013

(65) Prior Publication Data
US 2013/0206963 A1    Aug. 15, 2013

Related U.S. Application Data

(60) Provisional application No. 61/598,842, filed on Feb. 14, 2012.

(51) Int. Cl.
| | |
|---|---|
| *H01J 3/14* | (2006.01) |
| *G01D 5/36* | (2006.01) |
| *G02F 1/01* | (2006.01) |
| *G01J 1/04* | (2006.01) |
| *G02B 27/10* | (2006.01) |
| *G02B 27/28* | (2006.01) |
| *G01B 9/02* | (2006.01) |
| *G02B 27/48* | (2006.01) |

(52) U.S. Cl.
CPC ........... *G01J 1/0407* (2013.01); *G01B 9/02027* (2013.01); *G01B 9/02082* (2013.01); *G02B 27/10* (2013.01); *G02B 27/28* (2013.01); *G02B 27/283* (2013.01); *G02B 27/48* (2013.01); *G01B 2290/45* (2013.01)

(58) Field of Classification Search
CPC ....................................................... F41G 3/06
USPC .......... 250/221, 216, 208.1, 550, 225, 237 G, 250/559.09; 359/483.01–494.01, 558–576, 359/838, 839, 850; 356/450–521, 364–370, 356/432

See application file for complete search history.

(56) References Cited

U.S. PATENT DOCUMENTS

| | | | | |
|---|---|---|---|---|
| 4,733,065 A | * | 3/1988 | Hoshi | G11B 7/1353 250/201.5 |
| 5,708,634 A | * | 1/1998 | Alon et al. | 369/44.23 |
| 2009/0245077 A1 | * | 10/2009 | Ueda et al. | 369/121 |
| 2011/0103215 A1 | * | 5/2011 | Hotta et al. | 369/112.03 |

* cited by examiner

*Primary Examiner* — Pascal M Bui Pho
(74) *Attorney, Agent, or Firm* — Wilson Patent Law, LLC

(57) ABSTRACT

Methods, systems, and devices are provided that may facilitate multibeam coherent detection and/or speckle mitigation. For example, some embodiments provide for multiple simultaneous independent speckle realizations in light reflected from an actively illuminated target while also may simultaneously provide reference beams inherently aligned to each speckle. These tools and techniques may facilitate coherent detection of light returned from a target. In some cases, this may provide the basis for substantial speckle mitigation. With the addition of illumination phase or frequency modulation and/or intelligent algorithmic methods, some designs may utilize the multiple speckle returns to actively mitigate speckle noise, and can further be used to separately measure speckle phase to implement interferometric resolution surface tilt measurement and/or surface imaging. These tools and techniques may be utilized for other purposes related to multibeam coherent detection and/or speckle mitigation.

24 Claims, 7 Drawing Sheets

METHODS, SYSTEMS, AND DEVICES FOR MULTIBEAM COHERENT DETECTION AND SPECKLE MITIGATION

RELATED APPLICATIONS

The present Application for Patent claims priority to Provisional Application No. 61/598,842 entitled "METHODS AND APPARATUS FOR MULTIBEAM COHERENT DETECTION AND SPECKLE MITIGATION" filed Feb. 14, 2012, and assigned to the assignee hereof and hereby expressly incorporated by reference herein for all purposes.

BACKGROUND

Coherent optical systems may face a variety of different issues. For example, some coherent optical systems may face issues with regard to speckle fading in coherent detection. Speckle noise and phase uncertainty may also limit system performance for many coherent optical systems. Applications where speckle may be an important performance factor include but are not limited to: vibrometery, Doppler velocimetry, interferometric distance measurement, optical communications, and monochromatic imaging. Typically, these applications can include active illumination by a long coherence length source such as a laser.

SUMMARY

Methods, systems, and devices are provided that may facilitate multibeam coherent detection and/or speckle mitigation. For example, methods, systems, and devices are provided that may create multiple simultaneous independent speckle realizations in light reflected from an actively illuminated target while also simultaneously providing reference beams inherently aligned to each speckle. These tools and techniques may facilitate coherent detection of light returned from the target, thus may provide the basis for substantial speckle mitigation. With the addition of illumination phase or frequency modulation and/or intelligent methods, some designs may utilize the multiple speckle returns to actively mitigate speckle noise, and/or may further be used to separately measure speckle phase to implement interferometric resolution surface tilt measurement and surface imaging. These tools and techniques may be utilized for other purposes related to multibeam coherent detection and/or speckle mitigation.

Some embodiments include a system for facilitating multibeam coherent detection. The system may include: a coherent light source; a first beam splitter that generates at least two beams from light emitted from the coherent light source; a second beam splitter that transmits a portion of the at least two beams as interrogation beams towards one or more target interrogation regions of a target to be interrogated and that redirects light counter-propagating with respect to the interrogation beams from the one or more target interrogation regions; and/or a third beam splitter that reflects a portion of energy from each of the at least two interrogation beams back towards the second beam splitter.

In some embodiments, the system includes a ¼-wave waveplate positioned between the second beam splitter and the third beam splitter. The second beam splitter may polarize the multiple interrogation beams and the ¼-wave waveplate may convert the polarized interrogation beams to circular polarization.

Some embodiments include multiple detectors. Each respective detector may correspond to one of the portions of energy reflected from the third beam splitter back toward the second beam splitter and each respective detector defines a coherent detection region for the counter-propagating light from the one or more target interrogation regions of the target. Some embodiments include one or more optical elements positioned between the second beam splitter and the multiple detectors, where the one or more optical elements separate the counter-propagating light from the one or more target interrogation regions.

In some embodiments, the second beam splitter and the third beam splitter are positioned with respect to each other such that the counter-propagating light from at least one of the target interrogation regions and the reflected portion of energy from at least one of the corresponding beams from the third beam splitter overlap for substantially a first beam diameter and a first beam angle. In some embodiments, the second beam splitter and the third beam splitter are positioned with respect to each other such that coherent mixing of the counter-propagating light from at least one of the target interrogation regions and the reflected portion of energy from at least one of the corresponding beams from the third beam splitter occurs at a surface of the third beam splitter.

The system may include one or more signal processors that process one or more signals from the multiple detectors to mitigate speckle. The one or more signals from the multiple detectors may be processed independently to produce one or more image pixels.

In some embodiments, the coherent light source is chirped in at least frequency or phase to effect frequency modulated continuous wave (FMCW) ranging to implement a range imager. In some embodiments, the first beam splitter includes an active device that scans in at least one or more beam angles or one or more beam patterns to map the target. Some embodiments include a conditioner that conditions the light from the coherent light source. Some embodiments include an isolator that prevents back reflections from at least one of the beam splitters or the target from altering an operation of the coherent light source. Some embodiments include a modulator that modulates at least one of the interrogation beams, the counter-propagating light, or the reflected portion of energy from each of the two or more beams.

In some embodiments, the first beam splitter includes a diffraction grating. In some embodiments, the second beam splitter includes a polarizing beam splitter. In some embodiments, the third beam splitter includes a Local Oscillator Mirror.

The multiple detectors may include an array detector with equal spacing and may be arranged to match a beam pattern produced by the first beam splitter. Some embodiments include one or more optical components positioned between the third beam splitter and the target to effect at least redirection of the interrogation beams or focusing of the interrogation beams.

Some embodiments include a method to facilitate multibeam coherent detection. The method may include: generating at least two beams from a coherent light source; transmitting a portion of the at least two beams as interrogation beams towards one or more target interrogation regions of a target to be interrogated; redirecting light counter-propagating with respect to the interrogation beams from the one or more target interrogation regions; and/or reflecting a portion of energy from each of the at least two interrogation beams back towards the at least two interrogation beams.

In some embodiments, the method includes polarizing at least the interrogation beams, the counter-propagating light, or the reflected portion of energy from each of the at least two beams. Polarizing at least the interrogation beams, the counter-propagating light, or the reflected portion of energy from each of the at least two beams may include polarizing the interrogation beams and converting the polarized interrogation beams to circular polarization.

In some embodiments, the method includes detecting the reflected portions of energy from each of the at least two or more interrogation beams along with the counter-propagating light from the one or more target interrogation regions of the target. In some embodiments, the counter-propagating light from at least one of the target interrogation regions and the reflected portion of energy from at least one of the corresponding beams overlap for substantially a first beam diameter and a first beam angle.

Some embodiments of the method include mixing coherently the counter-propagating light from at least one of the target interrogation regions and the reflected portion of energy from at least one of the corresponding beams. Some embodiments include separating the counter-propagating light from the one or more target interrogation regions. Some embodiments include processing one or more detected signals to mitigate speckle. Processing one or more detected signals may be done independently to produce one or more image pixels.

Some embodiments of the method include chirping light from the coherent light source in at least frequency or phase to effect frequency modulated continuous wave (FMCW) ranging to implement a range imager. Some embodiments include scanning in at least one or more beam angles or one or more beam patterns to map the target. Some embodiments include conditioning light from the coherent light source. Some embodiments include isolating light from the coherent light source that prevents reflections from at least one of the beam splitters or the target from altering an operation of the coherent light source.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
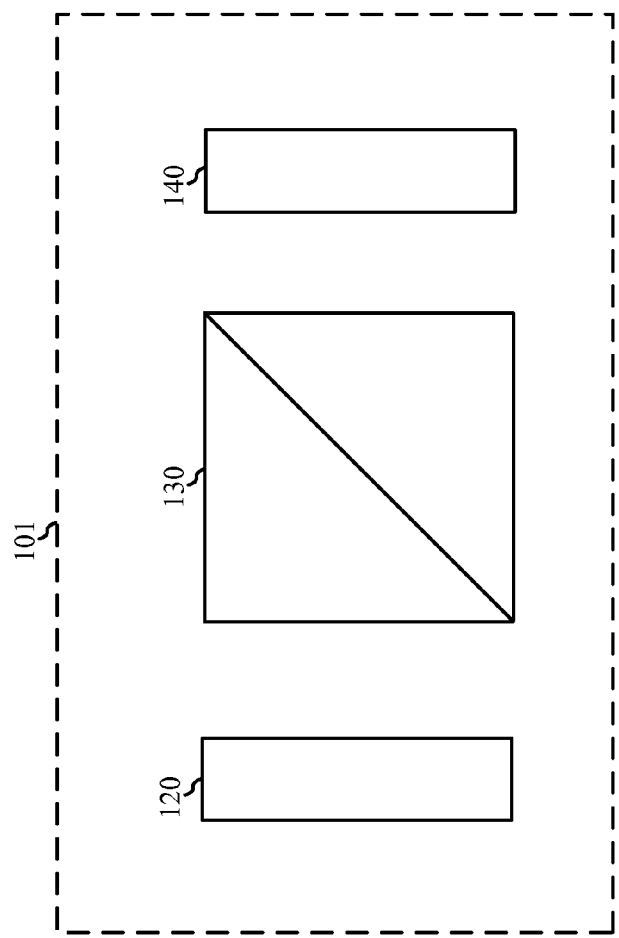
FIG. 1A shows a block diagram of a system and/or device for facilitating multibeam coherent detection in accordance with various embodiments.

This description provides examples, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Methods, systems, and devices are provided that may facilitate multibeam coherent detection and/or speckle mitigation. For example, methods, systems, and devices are provided that may create multiple simultaneous independent speckle realizations in light reflected from an actively illuminated target while also simultaneously providing reference beams inherently aligned to each speckle. These tools and techniques may facilitate coherent detection of light returned from the target, thus may provide the basis for substantial speckle mitigation. With the addition of illumination phase or frequency modulation and/or intelligent methods, some designs may utilize the multiple speckle returns to actively mitigate speckle noise, and/or may further be used to separately measure speckle phase to implement interferometric resolution surface tilt measurement and surface imaging. These tools and techniques may be utilized for other purposes related to multibeam coherent detection and/or speckle mitigation as discussed herein.

Some embodiments are configured for multibeam coherent detection and/or speckle mitigation where the system may include at least one coherent light source and a first beam splitter configured to generate two or more beams from the at least one coherent light source. A second beam splitter may be configured to permit substantial transmission of the two or more beams as interrogation beams in one or more directions of a target to be interrogated at one or more target interrogation regions and to substantially redirect light counter-propagating to the interrogation beams. A third beam splitter may be configured to reflect a small portion of energy of the two or more beams back toward the second beam splitter.

Some embodiments may include multiple detectors. Each respective detector may correspond to a respective beam from the two or more beams from the third beam splitter and each detector defines a coherent detection region for light returning from the target. Some systems may include at least an electronic device, an electro-optical (EO) device, an acousto-optical (AO) device, or mechanical device that may be configured to provide optical phase or frequency modulation of at least the transmitted coherent optical beam or a sampled reference beam.

In some cases, the detector signals may be processed independently in at least a phase, a frequency, or an intensity domain to produce at least target vibration imaging, Doppler velocity imaging, or coherent scattering imaging. The first beam splitter may include an active EO or AO device that may be configured to be at least tuned or driven to effect a scan in beamlet angles or patterns to map a target or achieve higher sampling density, or greater speckle mitigation.

Figure 1B:
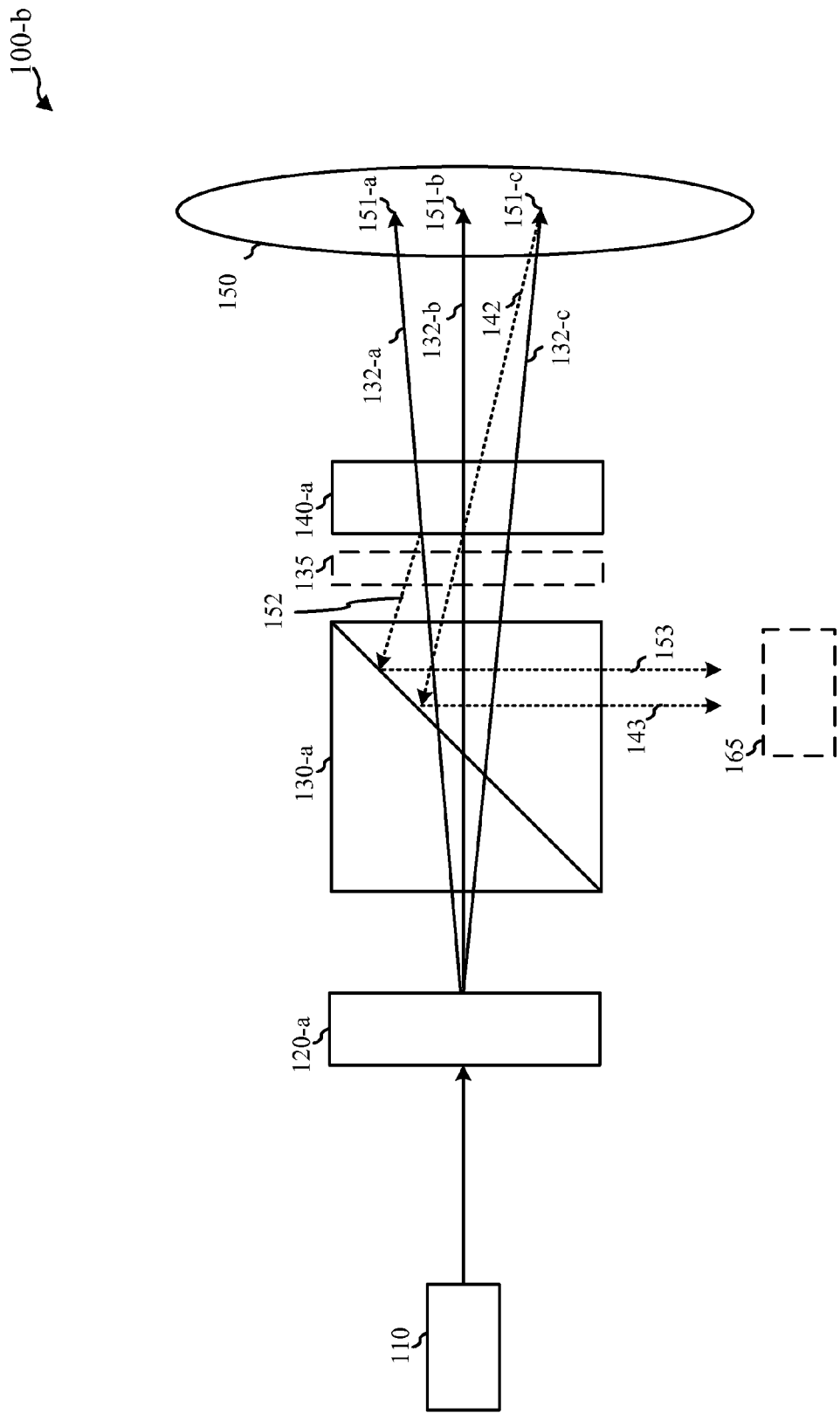
FIG. 1B shows a block diagram of a system for facilitating multibeam coherent detection in accordance with various embodiments.

Turning now to FIG. 1A, a block diagram of a system 100-$a$ and/or device 101 for facilitating multibeam coherent detection is shown in accordance with various embodiments. FIG. 1B also shows a block diagram of a system 100-$b$ for facilitating multibeam coherent detection. System 100-$b$ may give an example of one or more aspects of system 100-$a$. Aspects of system 100-$b$ may be included in system 100-$a$ in some embodiments. System 100-$a$ and/or system 100-$b$ may include more or less components in some embodiments. Other embodiments may also utilize other configurations of these components and/or other components.

System 100-$a$ shows multiple beam splitters 120, 130, and/or 140, which may be configured as a device 101 in some embodiments. Beam splitter 120 may generate multiple beams from light emitted from a coherent light source. Some embodiments, for example, may generate two or three beams, though other embodiments may generate more beams. Beam splitter 130 may then transmit portion of the multiple beams as interrogation beams towards one or more target interrogation regions of a target to be interrogated. In some cases, beam splitter 130 may polarize the interrogation beams. Beam splitter 130 may also redirect light counter-propagating with respect to the interrogation beams from the one or more target interrogation regions. Beam splitter 140 may reflect a portion of energy from each of the interrogation beams back towards beam splitter 130.

In some embodiments, beam splitter 130 and beam splitter 140 are positioned with respect to each other such that the counter-propagating light from at least one of the target interrogation regions and the reflected portion of energy from at least one of the corresponding beams from the beam splitter 140 overlap for substantially a first beam diameter and a first beam angle. Beam splitter 130 and the beam splitter 140 may be positioned with respect to each other such that coherent mixing of the counter-propagating light from at least one of the target interrogation regions and the reflected portion of energy from at least one of the corresponding beams from beam splitter 140 may occur at a surface of beam splitter 140. The coherently mixed beam may then be reflected at beam splitter 130 as a continuing coherently mixed beam.

Device 101 may include other components not shown in FIG. 1A. Some of these other possible components are discussed below with respect to FIG. 1B and/or the other figures. Merely by way of example, device 101 may also include a coherent light source in some embodiments. Device 101 may also include ¼-wave ($\lambda$/4) waveplate positioned between beam splitter 130 and beam splitter 140. Device 101 may also be configured with different optical components to help focus and/or direct the light propagating into device 101, out of device 101, and/or through device 101. In some cases, device 101 may be configured to include one or more detectors.

Turning now to FIG. 1B, system 100-$b$ may include a coherent light source 110. A beam splitter 120-$a$ may generate at least two beams from light emitted from the coherent light source 110. Beam splitter 130-$a$ may transmit a portion of the at least two beams as interrogation beams towards one or more target interrogation regions of a target 150 to be interrogated. The example shows three interrogation beams 132-$a$, 132-$b$, and 132-$c$, though other embodiments may utilize more or less interrogation beams. The target interrogation regions may be indicated as regions 151-$a$, 151-$b$, and/or 151-$c$, though other embodiments may utilize more or less target interrogation regions. Beam splitter 130-$a$ may redirect light counter-propagating with respect to the interrogation beams 132 from the one or more target interrogation regions 151. The counter-propagating light may be shown as 142 from region 151-$c$. Similar counter-propagating light may come from the other target interrogation regions, but are not shown in order to provide clarity in FIG. 1B. The redirected counter-propagating light from counter-propagating light 142 may be shown as redirected light 143. Beam splitter 140-$a$ may reflect portion of energy from each of the at least two interrogation beams back towards the beam splitter 130-$a$. This reflected light may be shown, for example, as reflected light 152. Note that beam splitter 130-$a$ may redirect reflected light 152 as redirected light 153.

Beam splitter 130-$a$ and beam splitter 140-$a$ may be positioned with respect to each other such that the counter-propagating light 142 from at least one of the target interrogation regions 151 and the reflected portion of energy 152 from at least one of the corresponding beams from beam splitter 140-$a$ overlap for substantially a first beam diameter and a first beam angle. In some embodiments, beam splitter 130-$a$ and beam splitter 140-$a$ are positioned with respect to each other such that coherent mixing of the counter-propagating light 142 from at least one of the target interrogation regions 151 and the reflected portion of energy 152 from at least one of the corresponding beams from beam splitter 140-$a$ occurs at a surface of beam splitter 140-$a$. The coherently mixed beam may be reflected at beam splitter 130-$a$ as a continuing coherently mixed beam. The continuing coherently mixed beam may continue to one or more detectors 165.

In some embodiments, system 100-$b$ may include a waveplate 135. In this example, waveplate 135 may include a $\lambda$/4 waveplate. Some embodiments may utilize different waveplates from a $\lambda$/4 waveplate. Waveplate 135 may be positioned between beam splitter 130-$a$ and beam splitter 140-$a$. In some configurations, beam splitter 130-$a$ may polarize, or select a polarization of, interrogation beams 132 and the waveplate 135 may convert the polarized interrogation beams to circular polarization.

In some embodiments, system 100-$b$ may include one or more detectors 165. In some configurations, detector 165 may include multiple detectors. Each respective detector may correspond to one of the portions of energy reflected from beam splitter 140-$a$ back toward beam splitter 130-$a$; this may be shown for example as reflected energy 153. In some cases, each respective detector may define and/or be placed at a coherent detection region for the counter-propagating light 142 from the one or more target interrogation regions 151 of the target 150.

Detector(s) 165 may also be configured as an array detector with equal spacing in some cases. An array detector with unequal spacing may also be utilized in some cases. When unequally spacing may be utilized, detector(s) 165 and one or more of the beams may be laterally symmetric so that the conjugate beams may mix with the opposite side target returns. Detector(s) 165 as array detector may be arranged to match a beam pattern produced by beam splitter 120-a as reflected by beam splitter 140-a. Detector(s) 165 may include more than one detector that covers light from each target interrogation region 151.

Coherent light source 110 may include a variety of different coherent light sources such as a laser. Some embodiments may utilize a laser diode as coherent light source 110. Coherent light source 110 may be coupled with a fiber with a ferule, which may compensate for angle in some cases. In some cases, a coupling lens may also be utilized.

Beam splitter 120-a may include a variety of different types of beam splitters including but not limited to diffraction gratings. For example, beam splitter 120-a may include one or more stacked binary diffraction gratings, sinusoidal diffraction grating, and/or complex holographic diffraction grating. Other embodiments may utilize other diffraction gratings. Beam splitter 120-a may include a phase plate in some cases. Beam splitter 130-a may include a variety of different types of beam splitters including but not limited to a polarizing beam splitter. Beam splitter 130-a may include a surface that may reflect different beams within system 100-b, such as redirecting light counter-propagating with respect to the interrogation beams 132 from the one or more target interrogation regions 151. Beam splitter 140-a may include a variety of different types of beam splitters. For example, in some embodiments, beam splitter 140-a may include a Local Oscillator Mirror (LOM), which may include a LOM support in some cases. In some embodiments, one or more piezo-electric translators (PZT) may be coupled between a LOM and a LOM support, which may provide for introducing phase modulation into system 100-b.

In some embodiments, beam splitter 120-a may include active device that can be tuned or driven to effect a scan or step in at least one or more beam angles or one or more beam patterns to map the target. These active devices may include an EO and/or AO device. A beam splitter 120-a as active device may also achieve a higher sampling density and/or greater speckle mitigation in some cases. In some embodiments, detector(s) 165 may have numerous elements per beam with appropriate elements selected for an active beam pattern. The active device may further shift the frequency and/or phase of each beam according to the beam angle to effect a select frequency and/or phase modulation for each detection region.

In some embodiments, coherent light source 110 is chirped in at least frequency or phase. This configuration may provide for frequency modulated continuous wave (FMCW) ranging to implement a range imager.

In some embodiments, system 100-b may include additional components that are not necessarily shown in FIG. 1B. Some of these possible additional components may be shown in other figures, such as within system 200 of FIG. 2 and/or system 300 of FIG. 3. For example, system 100-b may include conditioner that conditions the light from the coherent light source 110. This may include collimation optics for example. In some embodiments, the collimation optics may include one or more spatial filters. Some embodiments may include other beam forming components, such as a Gaussian beam converter. System 100-b may include an isolator that prevents back reflections from at least one of the beam splitters 120-a, 130-a, and/or 140-a, and/or the target 150 from altering an operation of coherent light source 110. This may include helping avoid disturbing the phase, frequency, and/or beam quality of coherent light source 110.

Some embodiments of system 100-b may include one or more modulators that modulates at least one of the interrogation beams 132, the counter-propagating light 142, or the reflected portion of energy 152 from each of the two or more beams. Such modulators may provide optical phase or frequency modulation through electronic, electro-optical, acousto-optical, mechanical, and/or other physical means.

System 100-b may include one or more optical components that may not be shown in FIG. 1B that may provide different functions. For example, in some embodiments, system 100-b may include one or more optical elements, such as one or more lenses, positioned between beam splitter 130-a and detector(s) 165. The one or more optical elements may separate the counter-propagating light 142 from the one or more target interrogation regions 151. Some embodiments may utilize one or more optical components positioned between beam splitter 140-a and target 150 to effect at least redirection of the interrogation beams 132 and/or focusing of the interrogation beams 132. In some configurations, these one or more optical components may be configured as a telescope. In some configurations, these one or more optical components may be configured to focus on and re-collimate from one or more prisms and/or one or more mirrors to send interrogation beams 132 in different directions. This may provide for remapping and/or scanning functionality. In some cases, these one or more components may provide for covering a larger areal extent than otherwise feasible.

Some embodiments of system 100-b may include one or more signal processors that may be coupled with detector(s) 165. The one or more signal process may process one or more signals from detector(s) 165 to mitigate speckle, for example. Signal processors may be utilized for a variety of purposes. For example, one or more signal processors may be utilized to amplify and/or filter signals from detector(s) 165 to separate DC, baseband, and/or modulated signals from detector(s) 165. Signal processors may also be utilized to improve SNR. In some embodiments, one or more signals from detector(s) 165 may be processed independently to produce one or more image pixels. For example, detector signals may be processed independently in phase, frequency, and/or intensity domain to produce target vibration imaging, Doppler velocity imaging, and/or coherent scattering imaging. In some cases, signal processing may be selected according to signal content, mathematically combining, selecting, spectrally decomposing, and/or correlating detected signals to effect speckle mitigation and/or differentiate phase between detector signals (e.g., tilt from a specular target, surface characteristics of a characteristic target). In some embodiments, surface speckle phase may be tracked between adjacent pixels of detector(s) 165 and speckle may be mapped within a speckle to effect active speckle area selection and/or phase sorting by a signal processor. This may be done to increase SNR when path reflective turbulence, for example, may be an issue.

Figure 2:
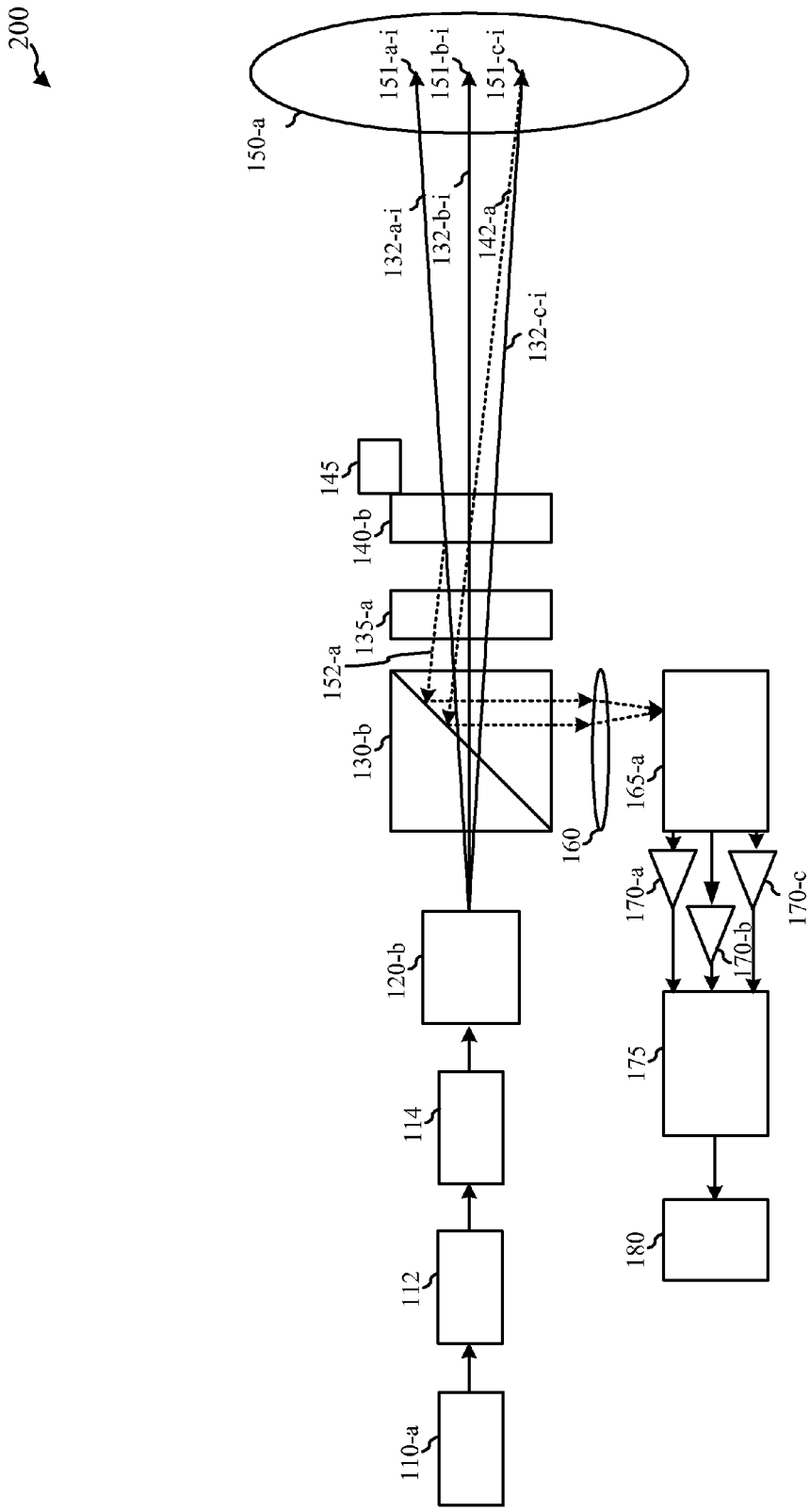
FIG. 2 shows a block diagram of a system for facilitating multibeam coherent detection in accordance with various embodiments.

FIG. 2 shows an example of the multibeam system 200 in accordance with various embodiments. In some cases, system 200 may be implemented in a homodyne architecture, which may be useful for speckle mitigation in vibrometry or coherent imaging. System 200 may also be useful for vibration or Doppler imaging. The homodyne architecture may be a simple single-phase coherent detection approach in some cases. The principles described herein may be applied to multi-beam quadrature optical detection architectures such as the Mach-Zehnder architecture, for example. System 200 may be an example of system 100-a and/or system 100-b in some embodiments. System 200 may utilize other architectures in accordance with various embodiments.

Light generated by coherent light source 110-a (e.g., laser or other) may be conditioned by collimator 112 and may impinge on beam splitter 120-b after passing through optical isolator 114. Isolator 114 may be included, for example, when reflections from beam splitter 120-b or other downstream elements may adversely affect the operation of light source 110-a.

Beam splitter 120-b may include a phase plate. For example, beam splitter 120-b may include a binary or holographic grating, or other phase plate appropriate for multiple beam creation. Beam splitter 120-b may create multiple divisions of the light or beam from coherent light source 110-a. This example shows three beams in one dimension for simplicity, but any plurality of beams in 1 or 2 dimensions with regular or irregular angular spacing may be employed without fundamentally altering the system 200 or component functions.

In this example, beams 132-a-i, 132-b-i, and 132-c-i emerge from beam splitter 120-b are shown to illuminate a target 150-a at three substantially separated regions denoted 151-a-i, 151-b-i, and 151-c-i, after passing through another beam splitter 130-b (which may be a polarizing beam splitter (PBS) in some cases), ¼-wave (λ/4) waveplate 135-a, and/or an additional beam splitter 140-b (which may be a Local Oscillator Mirror (LOM) in some cases). Other embodiments may illuminate target 150-a with more or less beams. The polarization of the transmitted beam may be oriented to maximize transmission through beam splitter 140-b, and may be subsequently converted to circular polarization by waveplate 135-a.

In some cases, the target 150-a may diffusely back scatter a portion of the light along the paths from region 151-a-i, 151-b-i, and 151-c-i (in this example, returning or counter-propagating light is show as 142-a from region 151-c-i; similar counter-propagating light may return from the other regions, but is not shown for simplicity) and may be converted to an orthogonal polarization by waveplate 135-a and subsequently may be reflected by beam splitter 130-b onto a corresponding element of multiple detectors 165-a. In some cases, the multiple detectors 165-a may be configured as a detector array. Detectors 165-a may be located near the image position that corresponds to the appropriate spot or region on target 150-a. In this case, the dashed ray 142-a may indicate the light path from spot or region 151-c-i (rays for spot or region 151-a-i and 151-b-i are omitted for clarity on the diagram, but follow similar paths at the appropriate angles for the corresponding spots). As the transmitted beams propagate through the beam splitter 140-b, which in this example is configured as a transmissive LOM, a small portion of each beam may be reflected back through waveplate 135 towards the beam splitter 130-b, which in this example is configured as a PBS. This is shown as beam 152-a, for example (a portion of other beams are omitted for clarity on the diagram, but follow similar paths at the appropriate angles for the corresponding regions). These retro-reflected beams, such as beam 152-a, may act as the local oscillator optical reference for coherent detection. Note that the angle for light returning from region 151-a-i may correspond to the reflection angle for beam 132-c-i from LOM 140-b and the local oscillator light from beam 132-c-i may be reflected with an angle matching the target return from beam 132-a-i.

The implication of the flipped conjugate mirror reflection angle parity may be that the distance between the LOM 140-b and beam splitter 120-b may need to be sufficiently short so that for a given beam diameter and angle, there may remain substantial overlap between the light returning from the target 150-a and the corresponding LO beam from LOM 140-b within the clear aperture of the system optics to ensure coherent mixing efficiency and throughput. The coherent interference (mixing) process may take place at the reflecting surface of LOM 140-b between the reflected LO beam and the target return propagating at the same angle toward PBS 130-b.

In some embodiments, a lens 160 may accept the target returns and their corresponding LO beams, and focus them on the detector array 165-a, which may form discrete separated target image spots on each array element corresponding to each illuminated spot on the target 150-a. If the system parameters are arranged so that each target spot illuminates a set of scattering elements that contains a substantial fraction of new scattering elements on the target, then the detector signal for each beam may represent the coherently detected signal from independent target speckles in accordance with the present invention.

In some cases, filtering and/or amplification may be implemented through corresponding amplifiers 170-a, 170-b, and/or 170-c. The signals from corresponding detectors 165-a can be subjected to independent or codependent signal processing by signal processor 175 and subsequently exit the system 200 at output 180, for example, for recording, spectral analysis, display, reproduction, process control, and/or other use appropriate for the application.

In some applications, it may be desirable to modulate the phase of the LO relative to the target return to produce phase modulation of the return signal so that the detected return signal frequency may be substantially removed from DC or 0-frequency, or to create a common modulation tag or pilot signal for all speckle return signals. For this purpose, one or more piezo-electric translator (PZT) 145 may be attached, for example, between the LO mirror and the LOM 140-b physical support to adjust the position of the LOM 140-b at the desired phase modulation frequency. This may be particularly useful in vibration and/or Doppler velocity sensing, where there may be directional ambiguity in the phase shift due to target motion, and for tilt sensing where the relative optical return signal amplitudes must be ignored to solve uniquely for the relative phase. In the latter case, the phase of the detected modulation can be observed without amplitude uncertainty, which may not be the case for a static DC return in the unmodulated case. If the coherent light source 110-a is a diode laser source, for example, than phase modulation can be implemented by modulating the laser drive current as well, with similar performance, however AM modulation and frequency modulation of both the transmitted laser and the LO beams simultaneously occur, while the LOM 140-b position modulation may result in a pure phase modulation of the LO beams.

One may also note that an active modulation of the coherent light source 110-a optical frequency either through electrical current modulation of a laser diode, or by interposing a conventional Acoustic Optic (AO) and/or Electro Optic (EO) phase modulator between isolator 114 and beam splitter 120-b may cause an additional scanning of the beam angles enabling greater surface or speckle coverage, if useful in the application. Further, the beam splitter 120-b could also be an active EO or AO device allowing active control of the sampling angles or modulation frequencies. To facilitate adjustable operation, the detector array 165-a or multiple detectors in general may have many elements per beam to accommodate the shifting image locations, or the beam splitter 120-b may be operated to produce discrete angular steps that match the detector pitch. In some cases, distributed targets, such as the atmosphere, ocean, and/or other transmissive scattering fluids may be utilized as targets 150-a.

In some embodiments, one or more detectors 165-a that may have the largest SNR may be selected and output by the signal processor 175 to effect maximum SNR. The signals from each detector 165-a may be tracked and the signal may be phase digitally adjusted for the selected channel to prevent abrupt switching noise due to phase jumps when the maximum SNR channel is selected.

In some embodiments, tilt sensing from a single location on a specular surface may be used to track the detected phase of the phase modulation light returning from the target 150-a in each channel. The relative phase may indicate the interferometric difference in range between the multiple beamlets. This may also be useful for optical surface testing and precision alignment of surfaces. Light may be focused on the surface to ensure some specular return for each beam on the target and to ensure a known separation of the beam centers on the target 150-a.

Figure 3:
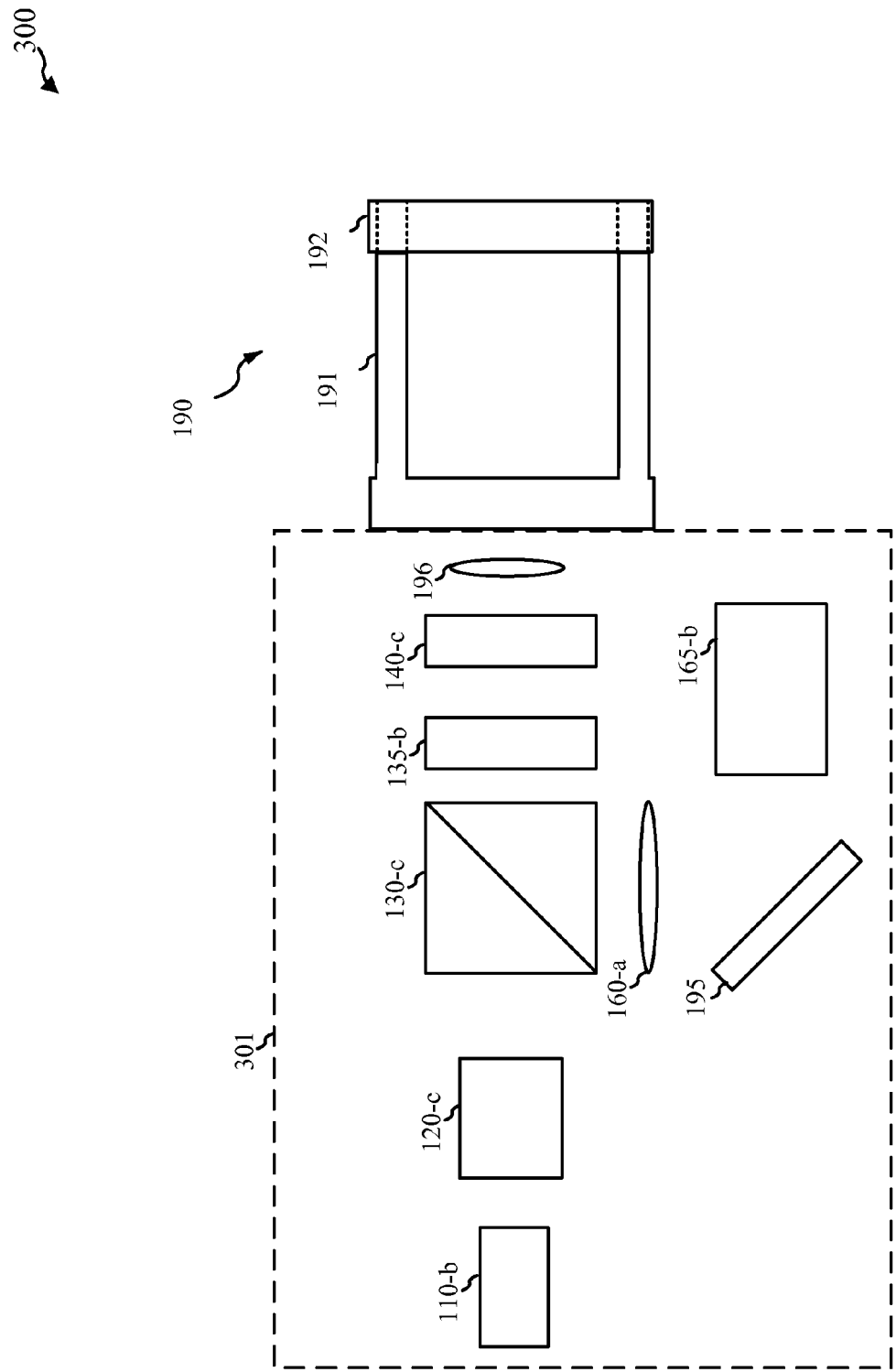
FIG. 3 shows a block diagram of a system for facilitating multibeam coherent detection in accordance with various embodiments.

Some embodiments may include a telescope or other focusing or expansion optics that may be added between LOM 140-b, or a beam splitter in general, and target 150-a to effect control of the spot sampling size at the target and to affect the signal to noise ratio (SNR) at the desired operational range. FIG. 3, for example, shows an example of a system 300 that may utilize additional optics between beam splitter 140-c and a target. For example, FIG. 3 shows a subsystem or device 301 that may include a coherent light source 110-b, a first beam splitter 120-c, a second beam splitter 130-c, a quarter wave waveplate 135-b, a third beam splitter 140-c, a lens 160-a, and a detector 165-b. Similar systems components are discussed above with respect to FIG. 1A, FIG. 1B, and/or FIG. 2 and are not repeated here. System 301 may also include reflector 195 to direct light emerging from lens 160-a to detector 165-b. System 301 shows a lens 196 that may be utilized to redirect and/or focus light coming from the third beam splitter 140-c. In some embodiments, lens 196 may be a telescope input lens. In some configurations, a telescope 190 may be added. Telescope 190 may include a lens 192 that may be translated longitudinally with respect to lens 196 along one or more supports 191 in order to provide focus.

Figure 4A:
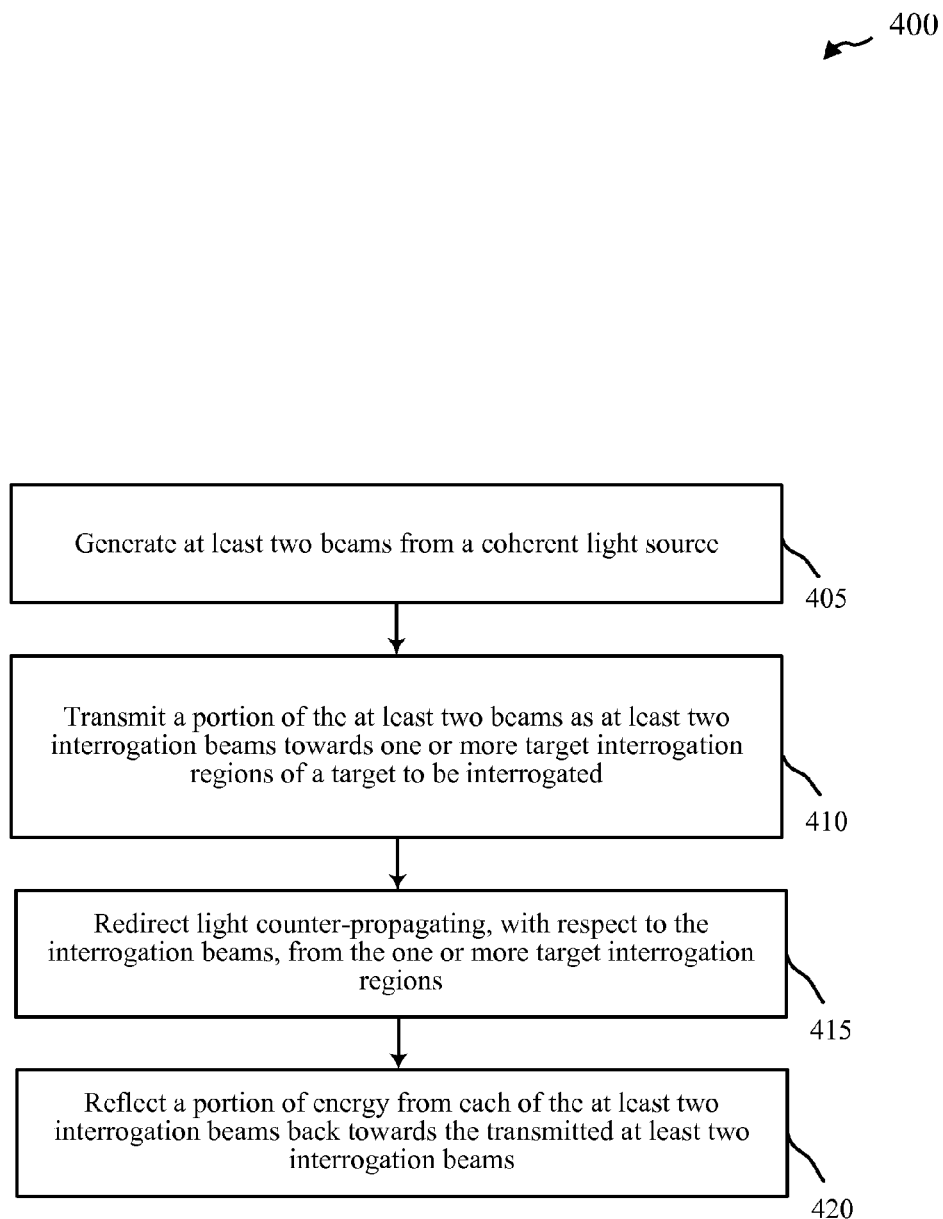
FIG. 4A shows a flow diagram of a method for facilitating multibeam coherent detection in accordance with various embodiments.

Turning now to FIG. 4A, a flow diagram 400 of a method to facilitate multibeam coherent detection is provided. Method 400 may be implemented utilizing a variety of systems and/or devices including, but not limited to, those shown in FIG. 1A, FIG. 1B, FIG. 2 and/or FIG. 3.

At block 405, at least two beams may be generated from a coherent light source. Some embodiments of method 400 include conditioning light from the coherent light source.

In some cases, light from the coherent light source may be isolated. This may prevent reflections from at least one of the beam splitters or the target from altering an operation of the coherent light source. Some embodiments of method 400 may include chirping light from the coherent light source in at least frequency or phase. This may be done to effect frequency modulated continuous wave (FMCW) ranging to implement a range imager.

At block 410, a portion of the at least two beams may be transmitted as at least two interrogation beams towards one or more target interrogation regions of a target to be interrogated. At block 415, light counter-propagating with respect to the at least two interrogation beams from the one or more target interrogation regions may be redirected. At block 420, a portion of energy from each of the at least two interrogation beams may be reflected back towards the at least two interrogation beams.

In some cases, at least the interrogation beams, the counter-propagating light, or the reflected portion of energy from each of the at least two beams may be polarized. For example, polarizing at least the interrogation beams, the counter-propagating light, or the reflected portion of energy from each of the at least two beams may include polarizing the interrogation beams and converting the polarized interrogation beams to circular polarization.

Some embodiments include detecting the reflected portions of energy from each of the at least two or more interrogation beams along with the counter-propagating light from the one or more target interrogation regions of the target. In some cases, the counter-propagating light from at least one of the target interrogation regions and the reflected portion of energy from at least one of the corresponding beams may overlap for substantially a first beam diameter and a first beam angle. Some embodiments include mixing coherently the counter-propagating light from at least one of the target interrogation regions and the reflected portion of energy from at least one of the corresponding beams.

Some embodiments of method 400 include separating the counter-propagating light from the one or more target interrogation regions. Some embodiments of method 400 include processing one or more detected signals to mitigate speckle. Processing one or more detected signals may be done independently to produce one or more image pixels.

Some embodiments of method 400 include scanning in at least one or more beam angles or one or more beam patterns to map the target.

Figure 4B:
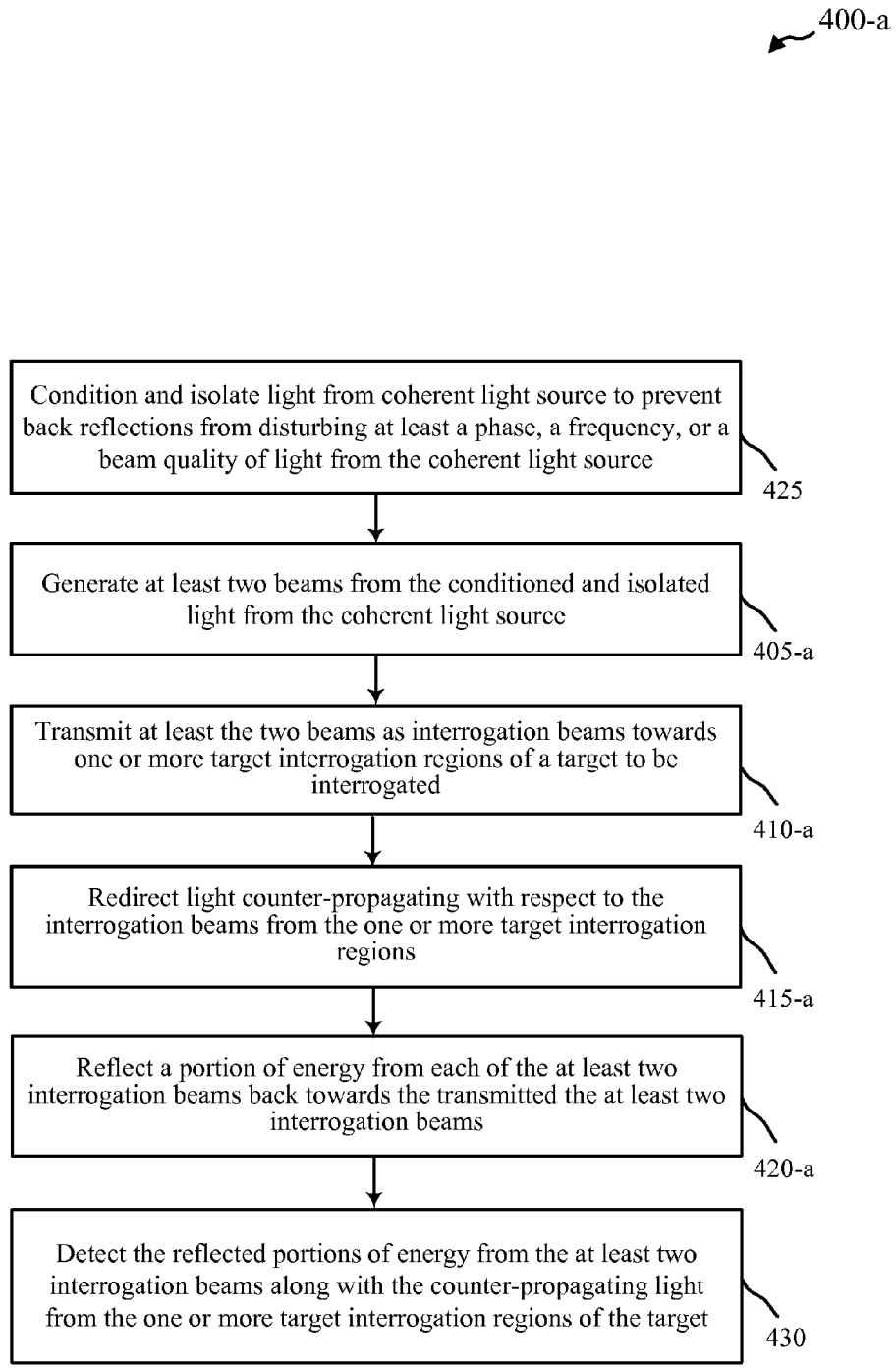
FIG. 4B shows a flow diagram of a method for facilitating multibeam coherent detection in accordance with various embodiments.

Turning now to FIG. 4B, a flow diagram 400-a of a method to facilitate multibeam coherent detection is provided. Method 400-a may be implemented utilizing a variety of systems and/or devices including, but not limited to, those shown in FIG. 1A, FIG. 1B, FIG. 2, and/or FIG. 3. Method 400-a may be an example of method 400 of FIG. 4A.

At block 425, light from a coherent light source may be conditioned and/or isolated to prevent back reflections from disturbing at least a phase, a frequency, or a beam quality of light from the coherent light source. At block 405-a, at least two beams may be generated from the conditioned and isolated light from the coherent light source. At block 410-a, at least the two beams may be transmitted as interrogation beams towards one or more target interrogation regions of a target to be interrogated. At block 415-a, light counter-propagating with respect to the interrogation beams from the one or more target interrogation regions may be redirected. At block 420-a, a portion of energy from each of the at least two interrogation beams may be reflected back towards the transmitted at least two interrogation beams. At block 430, the reflected portions of energy from the at least two interrogation beams along with the counter-propagating light from the one or more target interrogation regions of the target may be detected.

Figure 4C:
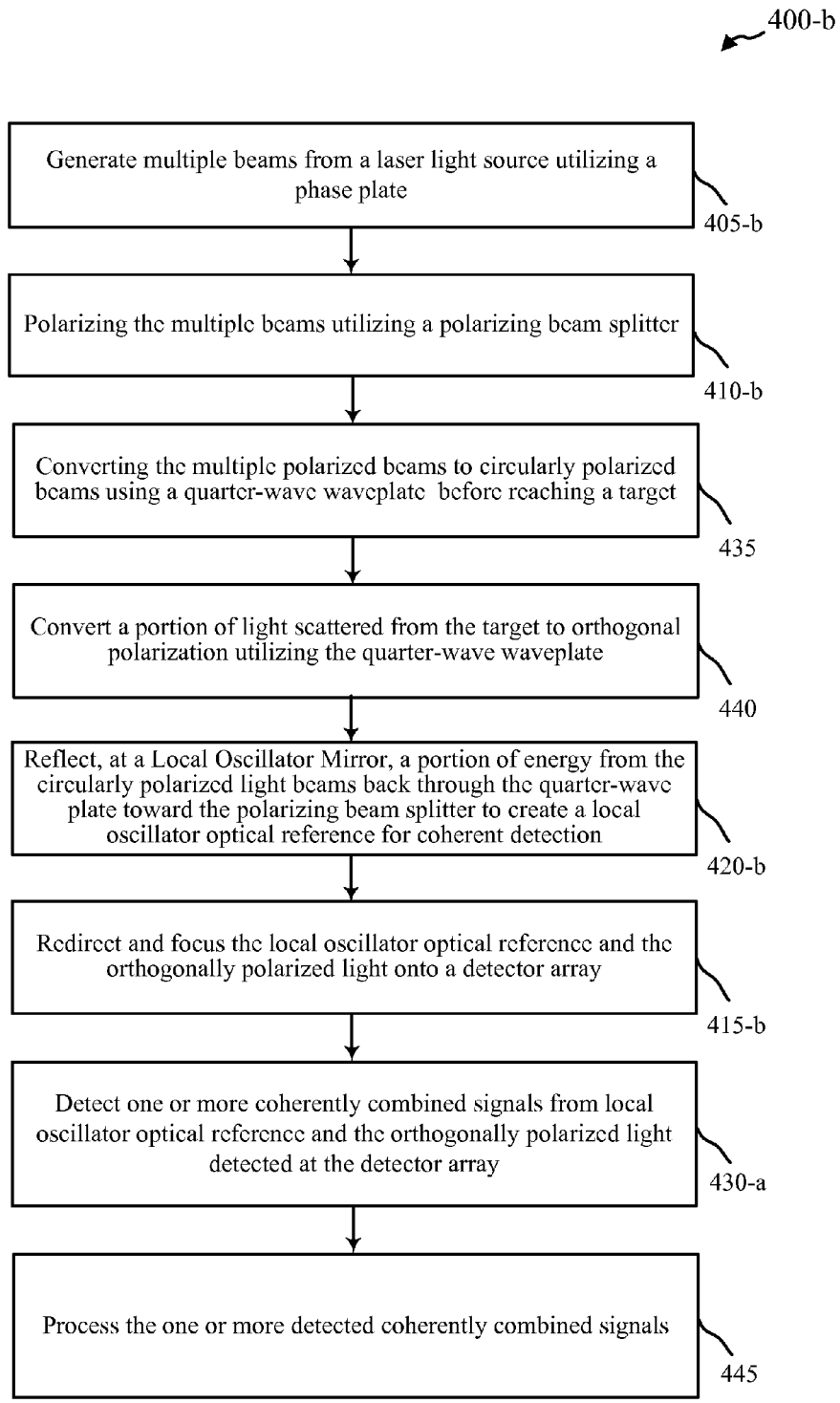
FIG. 4C shows a flow diagram of a method for facilitating multibeam coherent detection in accordance with various embodiments.

Turning now to FIG. 4C, a flow diagram 400-b of a method to facilitate multibeam coherent detection is provided. Method 400-b may be implemented utilizing a variety of systems and/or devices including, but not limited to, those shown in FIG. 1A, FIG. 1B, FIG. 2, and/or FIG. 3. Method 400-b may be an example of method 400 of FIG. 4A.

At block 405-b, multiple beams may be generated from a laser light source utilizing a phase plate. At block 410-a, the multiple beams may be polarized utilizing a polarizing beam splitter. At block 435, multiple polarized beams may be converted to circularly polarized beams using a quarter-wave waveplate before reaching a target. At block 440, a portion of light scattered from the target may be converted to an orthogonal polarization utilizing the quarter-wave waveplate.

At block 420-b, a Local Oscillator Mirror may be utilized to reflect a portion of energy from the circularly polarized light beams back through the quarter-wave plate toward the polarizing beam splitter to create a local oscillator optical reference for coherent detection. At block 415-b, the local oscillator optical reference and the orthogonally polarized light may be directed and focused onto a detector array. At block 430-a, one or more coherently combined signals from local oscillator optical reference and the orthogonally polarized light may be detected by the detector array. At block 445, the one or more detected coherently combined signals may be processed.

These embodiments may not capture the full extent of combination and permutations of materials and process equipment. However, they may demonstrate the range of applicability of the method, devices, and/or systems. The different embodiments may utilize more or less stages or steps than those described.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the disclosure.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of stages may be undertaken before, during, or after the above elements are considered. Accordingly, the above description should not be taken as limiting the scope of the invention.

The invention claimed is:

1. A system for facilitating multibeam coherent detection, the system comprising:
    a coherent light source;
    a first beam splitter that generates at least two beams from light emitted from the coherent light source;
    a second beam splitter that transmits a portion of the at least two beams as interrogation beams towards one or more target interrogation regions of a target to be interrogated and that redirects light counter-propagating with respect to the interrogation beams from the one or more target interrogation regions; and
    a third beam splitter that reflects a portion of energy from each of the at least two interrogation beams back towards the second beam splitter and transmits towards the second beam splitter the counter-propagating light with respect to the interrogation beams from the one or more target interrogation regions.

2. The system of claim 1, further comprising: a ¼-wave waveplate positioned between the second beam splitter and the third beam splitter, wherein the second beam splitter polarizes the plurality of interrogation beams and the ¼-wave waveplate converts the polarized interrogation beams to circular polarization.

3. The system of claim 2, further comprising: a plurality of detectors, wherein each respective detector corresponds to one of the portions of energy reflected from the third beam splitter back toward the second beam splitter and each respective detector defines a coherent detection region for the counter-propagating light from the one or more target interrogation regions of the target.

4. The system of claim 3, further comprising: one or more optical elements positioned between the second beam splitter and the plurality of detectors, wherein the one or more optical elements separate the counter-propagating light from the one or more target interrogation regions.

5. The system of claim 1, wherein the second beam splitter and the third beam splitter are positioned with respect to each other such that the counter-propagating light from at least one of the target interrogation regions and the reflected portion of energy from at least one of the corresponding beams from the third beam splitter overlap for substantially a first beam diameter and a first beam angle.

6. The system of claim 1, wherein the second beam splitter and the third beam splitter are positioned with respect to each other such that coherent mixing of the counter-propagating light from at least one of the target interrogation regions and the reflected portion of energy from at least one of the corresponding beams from the third beam splitter occurs at a surface of the third beam splitter.

7. The system of claim 3, further comprising: one or more signal processors that process one or more signals from the plurality of detectors to mitigate speckle.

8. The system of claim 3, wherein one or more signals from the plurality of detectors are processed independently to produce one or more image pixels.

9. The system of claim 3, wherein the coherent light source is chirped in at least frequency or phase to effect frequency modulated continuous wave (FMCW) ranging to implement a range imager.

10. The system of claim 1, wherein the first beam splitter comprises an active device that scans in at least one or more beam angles or one or more beam patterns to map the target.

11. The system of claim 1, further comprising: a conditioner that conditions the light from the coherent light source.

12. The system of claim 1, further comprising: an isolator that prevents back reflections from at least one of the beam splitters or the target from altering an operation of the coherent light source.

13. The system of claim 1, further comprising: a modulator that modulates at least one of the interrogation beams, the counter-propagating light, or the reflected portion of energy from each of the two or more beams.

14. The system of claim 1, wherein the first beam splitter comprises a diffraction grating.

15. The system of claim 1, wherein the second beam splitter comprises a polarizing beam splitter.

16. The system of claim 1, wherein the third beam splitter comprises a Local Oscillator Mirror.

17. The system of claim 3, wherein the plurality of detectors comprises an array detector with equal spacing and is arranged to match a beam pattern produced by the first beam splitter.

18. The system of claim 1, further comprising: one or more optical components positioned between the third beam splitter and the target to effect at least redirection of the interrogation beams or focusing of the interrogation beams.

19. The system of claim 1, wherein the portion of energy from each of the at least two interrogation beams reflected from the third beam splitter back towards the second beam splitter form one or more reference beams with respect to the counter-propagating light from the one or more target interrogation regions of the target transmitted towards the second beam splitter from third beam splitter.

20. The system of claim 19, wherein the third beam splitter is positioned such that the counter-propagating light from the one or more target interrogation regions of the target and the one or more reference beams mix at a surface of the third beam splitter to form one or more coherently mixed beams.

21. The system of claim 20, wherein the second beam splitter is positioned to redirect the one or more coherently mixed beams towards one or more detectors for coherent detection.

22. The system of claim 1, wherein the second beam splitter and the third beam splitter are positioned with respect to each other such that the counter-propagating light from at least one of the target interrogation regions transmitted towards the second beam splitter from the third beam splitter and the reflected portion of energy from at least one of the corresponding beams from the third beam splitter overlap for substantially a first beam diameter and a first beam angle.

23. The system of claim 1, wherein the second beam splitter and the third beam splitter are positioned with respect to each other such that coherent mixing of the counter-propagating light from at least one of the target interrogation regions transmitted towards the second beam splitter from the third beam splitter and the reflected portion of energy from at least one of the corresponding beams from the third beam splitter occurs at a surface of the third beam splitter.

24. The system of claim 1, wherein the second beam splitter and the third beam splitter are positioned with respect to each other such that the counter-propagating light from at least one of the target interrogation regions transmitted towards the second beam splitter from the third beam splitter and the reflected portion of energy from at least one of the corresponding beams from the third beam splitter coherently interfere.

* * * * *